United States Patent
Germanetti

(10) Patent No.: US 9,181,811 B2
(45) Date of Patent: Nov. 10, 2015

(54) DEVICE FOR VARYING LADE PITCH OF A LIFT ROTOR

(71) Applicant: AIRBUS HELICOPTERS, Marignane (FR)

(72) Inventor: Serge Germanetti, Marseilles (FR)

(73) Assignee: Airbus Helicopters, Marignane (FR)

( * ) Notice: Subject to any disclaimer, the term of this patent is extended or adjusted under 35 U.S.C. 154(b) by 393 days.

(21) Appl. No.: 13/671,906

(22) Filed: Nov. 8, 2012

(65) Prior Publication Data

US 2013/0119187 A1    May 16, 2013

(30) Foreign Application Priority Data

Nov. 10, 2011   (FR) ..................................... 11 03432

(51) Int. Cl.
*B64C 27/615*    (2006.01)
*B64C 27/605*    (2006.01)
*F01D 7/00*    (2006.01)
(Continued)

(52) U.S. Cl.
CPC ................ *F01D 7/00* (2013.01); *B64C 27/001* (2013.01); *B64C 27/06* (2013.01); *B64C 27/605* (2013.01); *B64C 27/615* (2013.01); *B64C 2027/7294* (2013.01); *Y02T 50/34* (2013.01)

(58) Field of Classification Search
CPC .... B64C 27/615; B64C 27/605; B64C 27/06; B64C 2027/7294; B64C 2027/7283; B64C 2027/7266; B64C 2027/7255; B64C 2027/7244; B64C 2027/7238; B64C 2027/7233; B64C 2027/7216; B64C 2027/004

USPC ........................... 244/17.25, 99.8, 99.13, 174
See application file for complete search history.

(56) References Cited

U.S. PATENT DOCUMENTS 2,716,460 A * 8/1955 Young ........................... 244/214
2,936,836 A    5/1960 Ellis
(Continued)

FOREIGN PATENT DOCUMENTS

EP    0729883 A1    9/1996
EP    0936140 A1    8/1999
(Continued)

OTHER PUBLICATIONS

"Reduction of Helicopter Blade-Vortex Interaction Noise by Active Rotor Control Technology" By: Yu, Gmelin, Splettstoesser, Philippe, Prieur and Brook. Published May 30, 1997. XP-002101523, vol. 33 pp. 647-687.

(Continued)

*Primary Examiner* — Tien Dinh
*Assistant Examiner* — Richard R Green
(74) *Attorney, Agent, or Firm* — Brooks Kushman P.C.

(57) ABSTRACT

The present invention relates to a device (10) for varying blade pitch of a rotary wing aircraft (50) having a main rotor (11) with a plurality of blades (12), each blade (12) including at least one main flap (13) fastened to the trailing edge of the blade (12). The angle of inclination of each flap (13) is controlled via a swashplate (20). The device (10) makes provision for electric actuators controlled by a flight control system (54) to be mounted in a stationary frame of reference for the purpose of moving and varying the angle of inclination of the non-rotary plate of the swashplate (20). The electric actuators provide primary flight control and also multi-cyclic control for the purpose of attenuating noise and vibration as generated in particular by the blades (12) and the rotor (11).

18 Claims, 3 Drawing Sheets

(51) Int. Cl.
 *B64C 27/06* (2006.01)
 *B64C 27/00* (2006.01)
 *B64C 27/72* (2006.01)

(56) References Cited

U.S. PATENT DOCUMENTS

| | | | |
|---|---|---|---|
| 3,095,931 | A | 7/1963 | Peiffer |
| 5,224,826 | A | 7/1993 | Hall et al. |
| 5,655,878 | A | 8/1997 | Yamakawa |
| 6,135,713 | A * | 10/2000 | Domzalski et al. ............ 416/23 |
| 8,177,508 | B2 | 5/2012 | Berthie |
| 2007/0131820 | A1 | 6/2007 | Chaudhry |
| 2008/0279685 | A1 * | 11/2008 | Kessler et al. ................ 416/147 |
| 2009/0140095 | A1 | 6/2009 | Sirohi |
| 2010/0178167 | A1 * | 7/2010 | Jänker et al. ...................... 416/1 |

FOREIGN PATENT DOCUMENTS

| | | |
|---|---|---|
| FR | 2927881 A1 | 8/2009 |
| JP | 2002362496 A | 12/2002 |

OTHER PUBLICATIONS

Search Report and Written Opinion; Application No. FR 1103432; dated Jul. 17, 2012.

* cited by examiner

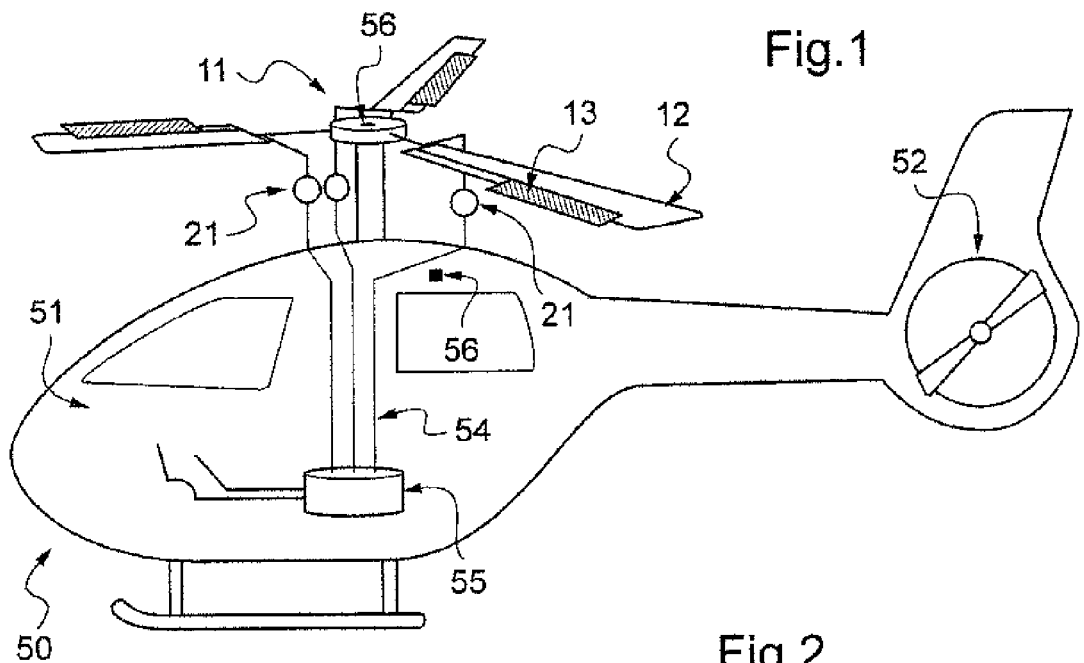
Fig.1
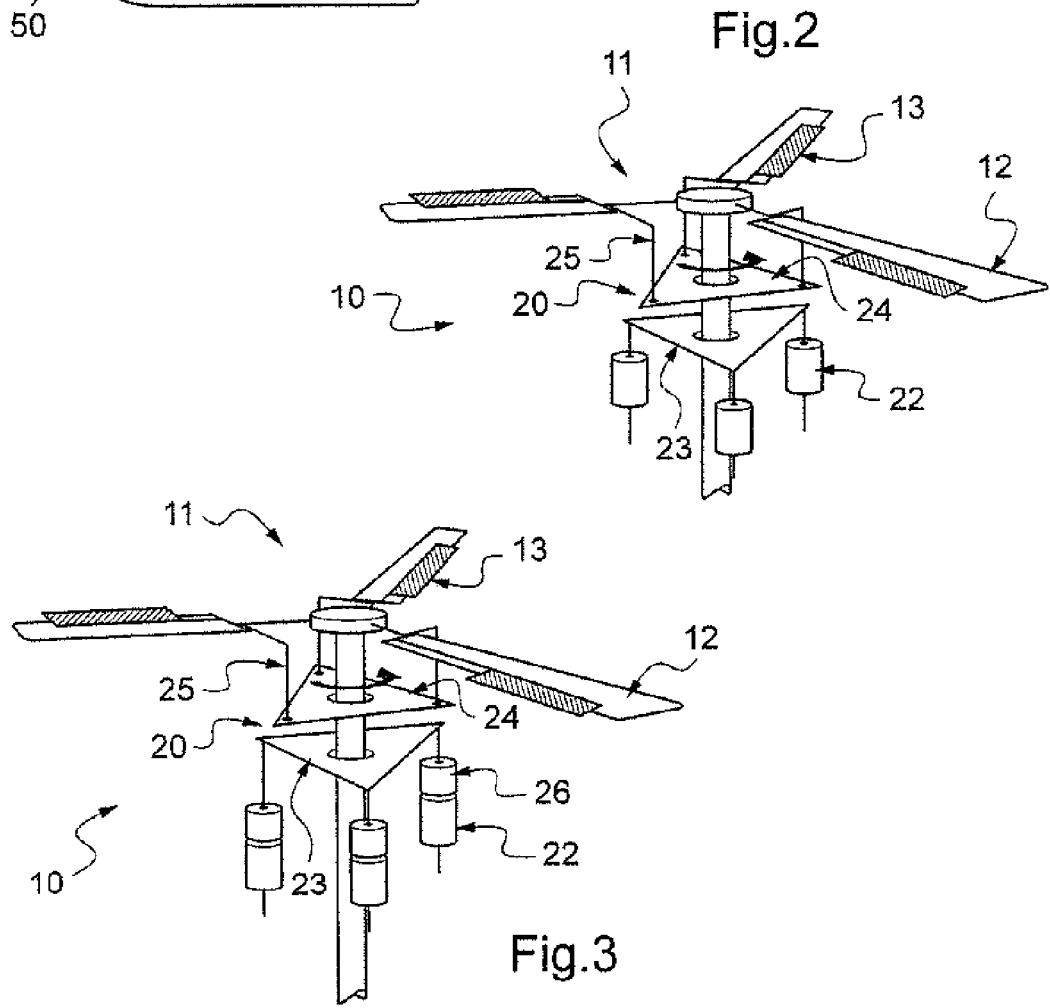
Fig.2
Fig.3

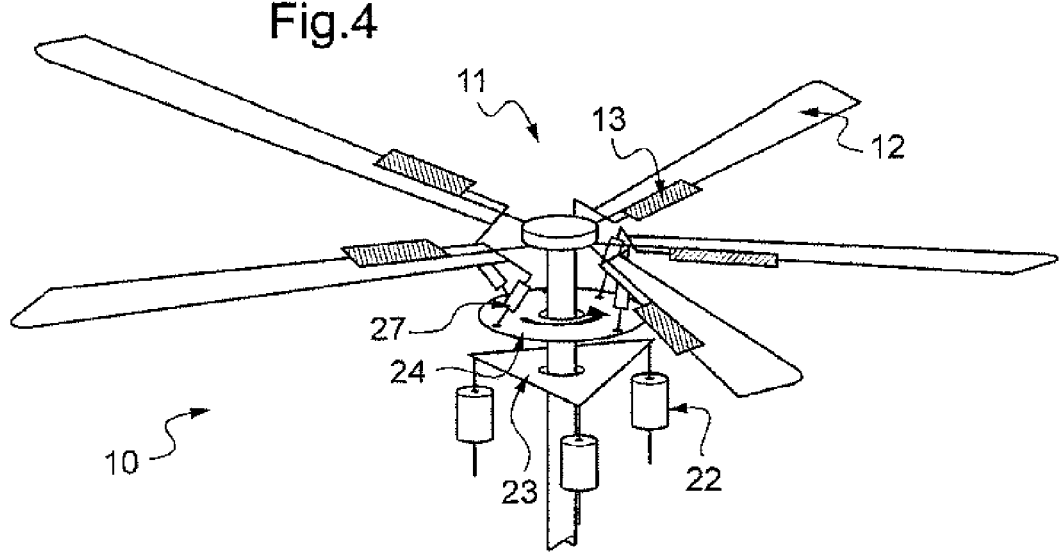
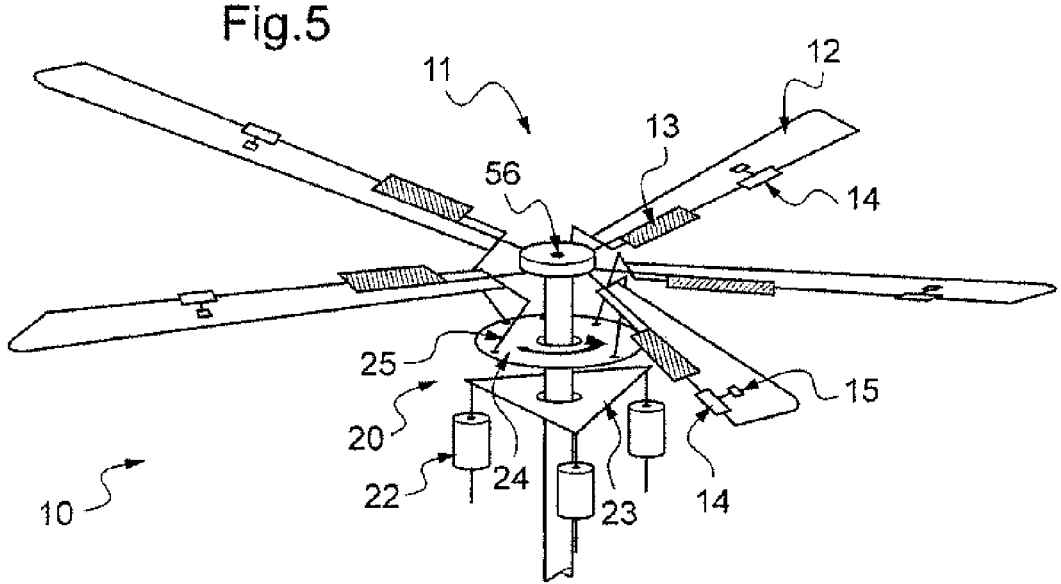

DEVICE FOR VARYING LADE PITCH OF A LIFT ROTOR

CROSS REFERENCE TO RELATED APPLICATIONS

The present application claims priority to French patent application No. FR 11/03432 filed on Nov. 10, 2011, the disclosure of which is incorporated in its entirety by reference herein.

BACKGROUND OF THE INVENTION (1) Field of the Invention

The present invention lies in the narrow technical field of flight control devices for an aircraft having a rotary wing with a plurality of blades. The invention relates to a device for varying blade pitch of a lift rotor. The invention also relates to a rotary wing aircraft having such a device.

(2) Description of Related Art

A rotary wing aircraft commonly includes a main rotor for providing lift and possibly also propulsion, which rotor has a plurality of blades.

The blades of the main rotor describe a very flat cone referred to by the person skilled in the art as the "rotor cone", with the plane of rotation of the rotor (referred to as the disk plane of the rotor and defined by the path followed by the tips of said blade) being perpendicular to the general thrust generated by the main rotor. This general thrust of the main rotor may then be resolved into a vertical lift force and a horizontal force that serves to cause the rotary wing aircraft to move in translation.

Consequently, the main rotor serves to provide the rotary wing aircraft both with lift and with propulsion.

Furthermore, by controlling the shape and the angle of inclination of the rotor cone relative to the frame of reference associated with the rotary wing aircraft, a pilot can direct said aircraft accurately.

In order to act on the rotor cone, the rotor disk is tilted relative to the drive plane of the main rotor, which drive plane is perpendicular to the mast of the main rotor (i.e. the shaft that drives the rotor in rotation). For this purpose, the angle of inclination of the rotor disk is controlled by cyclic variation of the pitch of the blade.

The rotary wing aircraft is thus provided with specific means for causing the pitch of each blade to vary, thereby varying the aerodynamic angle of attack of each blade relative to the incident air stream through which the blade passes.

In order to control the general thrust from the main rotor, both in magnitude and in direction, the pilot of the rotary wing aircraft thus generally acts on the value of the pitch angle of each blade by causing each blade to turn about its longitudinal pitch axis.

Thus, when the pilot orders a collective variation of pitch, i.e. the same variation of pitch for all of the blades, the pilot varies the magnitude of the general thrust from the main rotor so as to control the altitude and the speed of the rotary wing aircraft, with speed variation also involving a corresponding variation in drag.

In contrast, varying blade pitch collectively has no effect on the direction of that general thrust and the rotor disk remains parallel to the drive plane.

As explained above, varying the direction of the general thrust generated by the main rotor results from varying the angle of inclination (tilt) of the rotor disk, with this being done by varying the pitch of the blades not collectively, but cyclically. Under such circumstances, the pitch of a blade varies as a function of its azimuth angle, and during one complete revolution it passes between a maximum value and a minimum value, which values are obtained at opposite azimuth angles.

Cyclic variation of the pitch of the blades gives rise to cyclic variation in the thrust from the blades and thus to tilting of the rotor cone. By causing the pitch of the blades to vary cyclically, the pilot controls movement of the aircraft in translation and also controls its attitude as required for controlling it, under the effect of roll and pitching moments that are induced by the general thrust.

The device for performing these collective and cyclic variations of the pitch of the blades, and thus enabling the attitude, the lift, and the movement in translation of the aircraft to be controlled, is generally referred to by the person skilled in the art as the primary flight control or "PFC".

Furthermore, a rotary wing aircraft in flight generates a large amount of noise and vibration, in particular as a result of rotation of the blades and the main rotor assembly. For example, while the aircraft is descending, the turbulence generated by the end of a blade lies on the path of the following blade, with which it comes into collision accompanied by a characteristic slapping sound, constituting a source of noise and vibration.

Furthermore, high levels of vibration can also be generated by the main rotor if an unbalance appears in the rotor. In general, unbalance appears on a rotating element when the center of gravity of that element is not positioned on its axis of rotation.

For an aircraft main rotor, there are various reasons why unbalance may appear, in particular a difference in the weights of the blades, a movement of a blade away from its equilibrium position, or a movement of the center of gravity of a blade.

One known solution for attenuating those noise and vibration phenomena is to increase the angle of attack of each blade periodically, e.g. in such a manner as to expel the turbulence generated by the preceding blade downwards, and also in order to compensate for the offset between the center of gravity of the rotor and its axis of rotation.

Experience shows that the frequency with which the angle of attack of the blades is varied in order to attenuate noise and vibration phenomena is a function of the number of blades of the main rotor and is proportional to the frequency of rotation of the main rotor.

Tests have also confirmed that those variations in the angle of attack of the blades need to be performed at particular frequencies that are equivalent to the product $2\omega$, where $\omega$ corresponds to the speed of rotation of the main rotor, and also to the products $(b-1)\omega$, $b\omega$, and $(b+1)\omega$, where b corresponds to the number of blades of the main rotor.

In order to attenuate noise and vibration phenomena, it is thus found that the angle of attack of the blades needs to be modified at least twice during a single rotation of the main rotor. That is why the device for producing these variations in pitch that enable noise and vibration generated by the aircraft to be attenuated is generally referred to by the person skilled in the art as "multi-cyclic control", and is also known as "higher harmonic control" (HHC).

The prior art known to the person skilled in the art generally includes systems that separate primary flight control functions from functions of attenuating.

A swashplate device, usually referred to simply as a "swashplate", is used for primary flight control and controls cyclic and collective pitch variation of the blades by acting on the angle of inclination of each blade. The swashplate conventionally comprises a rotary plate and a non-rotary plate.

The collective and cyclic pitch controls of the pilot are connected via a linkage system to the non-rotary plate, the rotary plate being mechanically connected to each blade via a respective pitch control rod.

In order to simplify specifying components associated with the rotary plate or components associated with the non-rotary plate, two frames of reference are defined. A frame of reference referred to as the "stationary frame" is associated with the cabin of the aircraft, while a frame of reference referred to as the "rotary frame" is associated with the rotary plate and thus moves with the rotary plate relative to the stationary frame of reference.

When the pilot seeks to modify the collective pitch of the blades, the pilot acts on a control that causes the swashplate to move up or down as a whole, i.e. causes both its rotary and non-rotary plates to move together. The pitch control rods are then all moved through the same distance, which means that all of the blades change pitch by the same angle.

In contrast, when the blades are caused to vary pitch cyclically in order to cause the aircraft to go in a given direction, the swashplate is not moved vertically, but rather it is tilted relative to the mast of the main rotor. Each pitch control rod then moves in a direction and by an amount that is specific thereto, and the same goes for the pitch of the associated blade.

Although that device is effective and in widespread use, it requires considerable forces in order to maneuver the blades, particularly on heavy aircraft.

Furthermore, the presence of a swashplate penalizes the performance of the aircraft because of its large weight and dimensions that are needed as a result of the large forces to be transmitted to the blades, thereby giving rise in particular to aerodynamic disturbances that lead to an increase in drag.

It is also known that the pitch of the blades can be varied by means of flaps placed on the trailing edges of each of the blades. By varying the angle of inclination of a flap relative to the air flow, the lift generated by the blade-and-flap system is modified, and consequently, under the effect of aerodynamic forces, the pitch of each blade is modified.

Furthermore, the use of flaps makes it possible to reduce the forces that need to be deployed in order to obtain a change in the angle of attack of the blades insofar as the lift area of each flap is small compared with the lift area of the entire blade, but its effectiveness is considerable because of the speed of the air flow.

Document U.S. Pat. No. 3,095,931 describes mechanical flight controls. Flaps are situated at the trailing edge of each blade and controlled by a first linkage transmitting the movements of the swashplate to each of the flaps. The control mechanism uses a second linkage connecting together the cyclic pitch controls and the collective pitch controls at the swashplate, there being mechanical coupling between the cyclic pitch control and the collective pitch control.

Document FR 2 927 881 discloses a rotorcraft in which the rotor has as many vanes as it has blades. Each vane is associated with a single blade and is linked to the blade via a mechanical linkage. The vane, e.g. under the control of the swashplate, serves to modify the pitch angle of the associated blade. That device is particularly suitable for a two-blade rotor, with each vane then being arranged at 90° relative to the blade with which it is associated, however it can be generalized to any number of blades.

Document US 2007/0131820 seeks to eliminate the swashplate, which penalizes aircraft performance in terms of weight and drag. The flight control system described is controlled by flaps incorporated in the trailing edge of each blade, first flaps being used mainly for primary flight control and second flaps being used mainly for multi-cyclic control.

Each flap is controlled by an actuator directly incorporated in the blade. Furthermore, the second flaps, which are associated mainly with multi-cyclic control, are also capable, should the need arise, of taking over primary flight control.

The actuators incorporated in the blade may in particular be linear or rotary electric motors of the brushless direct current (BLDC) type.

Those motors and their particular application to helicopter blades are described in document WO 2008/048279.

Document U.S. Pat. No. 5,224,826 discloses a system of flaps positioned along the trailing edges of blades. Each flap is independently controlled by an electromechanical actuator, preferably of the piezoelectric type, that is incorporated in the blade. That device serves to change the pitch of the blade, and even, by virtue of the way the flaps are distributed along the blade, to modify the profile of the blade in different manners along its length.

Furthermore, document JP 2002/362496 describes a rotary wing aircraft having a mechanism for adjusting the pitch of the blades of the main rotor and a mechanism for controlling the pitch of flaps arranged on each blade. That mechanism for controlling the pitch of the flap is constituted by a first non-rotary plate fastened on a second non-rotary plate constituting the mechanism for controlling the pitch of the blades. Blade pitch control is used for maneuvering the aircraft, and flap pitch control is used for reducing the noise and vibration generated by the blades of the main rotor.

Document EP 0 936 140 discloses a system for controlling a rotor having blades with each blade having a flap positioned thereon. The pitch of the blades is controlled by means of a first rotary plate, while the pitch of the flaps is controlled by means of a second rotary plate independent of the first rotary plate, or else via actuators positioned in the rotating frame of reference.

Document US 2010/0178167 describes a method and a device for controlling the pitch of the blades of a rotor by using flaps positioned on each blade. Varying the pitch of each flap causes the pitch of the corresponding blade to be varied.

Document EP 0 729 883 discloses a multi-cyclic control system for controlling the pitch of blades of a helicopter rotor by using both cyclic actuators and multi-cyclic actuators for modifying the pitch of the blades. The cyclic actuators are located upstream from a non-rotary plate while the multi-cyclic actuators may be positioned upstream from the non-rotary plate or else they may be situated between the rotary plate and each of the blades.

The document "Reduction of helicopter blade-vortex interaction noise by active rotor control technology" published by Progress in Aerospace Sciences, Oxford, GB, Vol. 33, No. 9/10 of Sep. 1, 1997, describes in particular how to reduce the noise and vibration from the blades of a helicopter rotor by applying multi-cyclic control to the pitch of its blades. That control may be implemented in particular by using multi-cyclic actuators positioned upstream from a non-rotary plate, or indeed between a rotary plate and each of the blades. Such a system includes a control unit, a computer, and vibration sensors.

Document US 2009/0140095 discloses an electric helicopter in which the main rotor and the tail rotor are driven by respective dedicated electric motors. An electromechanical device controls pitch variation of the blades.

It can be observed that the technological background includes document U.S. Pat. No. 2,936,836, which describes an aircraft having two rotors, each having two blades. Each blade includes a flap serving to estimate and correct unbalances and differences of lift between the various blades.

Furthermore, tests have been carried out on a three-bladed main rotor concerning the configuration of three electrohydraulic actuators in the fixed frame of reference for the purpose of reducing vibration. Those actuators dedicated to multi-cyclic control act on the swashplate and are themselves controlled by means of an algorithm that analyzes vibration at certain points of the aircraft. Flight testing has demonstrated results that configuration with a three-bladed main rotor that are useful in terms of attenuating the vibration generated by the blades and the main rotor.

Finally, the ADASYS project involving Eurocopter, EADS, Daimler Chrysler Research Labs, and DLR, has shown that multi-cyclic control can be provided by a flap placed on the trailing edge of each blade of the main rotor, each flap being controlled independently by an electromechanical actuator of the piezo-ceramic type.

From the above considerations, it can be seen that using flaps on the trailing edges of blades and controlled by actuators incorporated in the blades for the purpose of primary flight control enables the performance of aircraft to be increased. Such use is accompanied by eliminating the swashplate, where its weight and its induced drag are very penalizing for the performance of such aircraft.

An object of the present invention is thus to propose an alternative solution to those designs.

It should be recalled that the blades of a rotary wing aircraft are extremely thin, i.e. the relative thickness of the aerodynamic profiles of the sections of each blade is small.

That makes it difficult to incorporate an actuator such as an electric motor or a hydraulic actuator in a blade together with its control system for modifying the angle of inclination of a flap positioned at the trailing edge of each of the blades.

It is also difficult to power such actuators, whether electrically or hydraulically, since power needs to pass from the stationary frame of reference to the rotary frame of reference, and that power must be sufficient for turning the flaps. Solutions do indeed exist for transferring such power, e.g. slip rings, however the reliability of such systems in an environment having high levels of vibration cannot always be guaranteed.

Furthermore, primary flight control must be guaranteed and safe so as to ensure the safety of the occupants of the aircraft. For that purpose, use is often made of solutions such as having multiple control circuits in order to accommodate risks of failure and in order to be able to remedy them while in flight. Consequently, when using trailing edge flaps for primary flight control, such control circuit multiplication (i.e. duplication multiplication by a number greater than two) adds additional complexity in the configuration of actuators inside the blades and in the transfer of power from the stationary frame of reference to the rotary frame of reference, as mentioned above.

In the event of a failure or a malfunction, the system as made safe by multiple control lines is capable of detecting the anomaly and of correcting it. Even if that operation takes place quickly, e.g. in less than one second, there nevertheless exists a moment during which the aircraft is not properly controlled, since the system is not operational. When using a swashplate, even if the actuators are jammed, all of the flaps and consequently all of the blades continue to operate cyclically as imposed by the swashplate. The behavior of the aircraft then remains relatively stable.

In contrast, if the swashplate is eliminated and replaced by actuators incorporated in the blades, i.e. in the rotary frame of reference, it is difficult to ensure that the flaps and consequently the blades remain synchronized over a cycle while the system is not operational. Under such circumstances, an unbalance may appear in the main rotor due to the lack of synchronization of the blades. The behavior of the aircraft can become unstable and very uncomfortable until the system has corrected the fault or the malfunction.

Consequently, in the event of a failure, the behavior of the aircraft when faced with failures is better if a swashplate is used, even if the behavior is transient and lasts only for the time needed to correct the problem.

Proper balancing of each blade is also most important for good operation of the aircraft, and the center of gravity of each blade must be in a precise position, e.g. relative to the pitch axis of the blade. Any offset in this position of the center of gravity of the blade and consequently any offset in the center of gravity of the main rotor including the blade affects both the operation of the blade and the comfort of the aircraft, considerable amounts of unbalance and vibration potentially being generated in the main rotor.

In addition, the actuator controlling the flaps, such as a piston and cylinder, has a movable portion, and as a result the center of gravity of the actuator moves a little while it is in use. Because of this, integrating actuators in blades adds elements that need to be taken into account when balancing a blade, and in particular the movement of the centers of gravity of actuators while they are in use potentially complicates such balancing, or even modifies balancing during a flight.

Furthermore, the source of power used at present for controlling the various movements of the blades is mainly of a hydraulic nature when using a swashplate, in particular for powering actuators controlling the movements of the swashplate. Although hydraulic technology has been in use for a long time and is well mastered, it nevertheless gives rise to certain constraints.

The elements needed for these functions, such as actuators and pumps are expensive and very penalizing in terms of weight. Incorporating them often requires a large amount of flexible pipework and various ducts for feeding the various elements, thus adding weight, cost, and complexity for configuration in a volume that is limited.

Furthermore, the sealing of the various hydraulic elements needs to be very thorough in an environment where there is a high level of vibration, since any reduction or loss of hydraulic pressure gives rise to a degradation or even to a loss of the flight controls of the aircraft. Hydraulic technology thus imposes constraints in terms of maintenance, and thus once more contributes to high costs in order to ensure reliability for the pumps, the actuators, and the hydraulic equipment as a whole.

Finally, protecting the environment is becoming more and more important nowadays regardless of the field of activity, whether technological or otherwise.

Hydraulic technology, in particular in terms of the recyclability of its components, and its fluids in particular, can have a negative impact on the environment.

BRIEF SUMMARY OF THE INVENTION

According to the invention, a device for varying blade pitch in a rotary wing aircraft comprises a main rotor having a plurality of blades driven in rotation via a hub, a main power transmission gearbox, and a power plant.

Each blade is connected to at least one main flap. Each main flap, movable in turning about an axis, may be secured to the trailing edge of a blade or may be arranged as in document FR 2 927 881, for example. The device for varying blade pitch also comprises main actuators acting directly or via mechanical links to control the angle of inclination of each main flap, and a flight control system that controls the main actuators.

While the main rotor is rotating, a change in the angle of inclination of the main flap of a blade causes the pitch of the corresponding blade to be varied under the action of aerodynamic forces.

This device is remarkable in that it comprises a swashplate, including a non-rotary plate and a rotary plate rotating with the main rotor, the main actuators being electric actuators mounted in the stationary frame of reference and serving to move and vary the angle of inclination of the non-rotary plate, there being a mechanical connection mounted in the rotary frame of reference and secured to the rotary plate that varies the angle of inclination of each main flap during movements of the swashplate.

Consequently, the electric actuators impart cyclic control to the main flaps and thus to the pitch of the blades.

Firstly, it can be understood that using one or more flaps on each blade in order to control the pitch of the blades serves to reduce the force required for imparting cyclic control. The hydraulic actuators conventionally used for controlling the movements and the angle of inclination of the swashplate can then be replaced by actuators that develop just enough force, and in particular electric actuators.

Such electric actuators adapted to the forces required for controlling the swashplate are of dimensions that are much smaller than the hydraulic actuators presently in use. In addition, reducing the forces required for controlling variations in blade pitch also makes it possible to reduce considerably the dimensions of the swashplate and the dimensions of the mechanical linkage system controlling the angles of inclination of the flaps.

As a result, the effects of the swashplate on the performance of the aircraft, in terms of weight and of drag, are considerably reduced. The performance of the aircraft can thus be improved, whether in terms of range or of payload.

The use of a swashplate also makes it possible to limit the consequences of failures that might involve the aircraft. The swashplate guarantees synchronization between the flaps over a cycle, and thus guarantees synchronization of the blades over a cycle, even when the system is temporarily not operational for the time required to process a failure or a malfunction, thereby guaranteeing relatively stable behavior while the incident is being corrected.

Furthermore, when coupled to an electric flight control system, for example, electric actuators make it possible to have an all-electric control system (100% electric), thereby eliminating the need for hydraulic power, thus procuring several advantages.

The use of such an all-electric control system enables controls to be made safe. It is possible to provide multiple control lines in an all-electric system in order to anticipate or correct any failure or disturbance concerning the controls.

Furthermore, aircraft maintenance is simplified by eliminating hydraulic equipment and by using an all-electric system, so the associated costs are thus reduced. Eliminating hydraulic power means eliminating gaskets, ducts, pumps, and the risks of leakage or loss of pressure: the risks of failures to be anticipated are thereby reduced.

Eliminating such hydraulic equipment and replacing it with electric actuators also makes it possible to reduce significantly the weight of the equipment and also its costs.

Finally, eliminating hydraulic power makes it possible to be more environmentally friendly, since the risk of leaks and the problems of recycling hydraulic appliances and fluids are eliminated.

The use of such a device for varying blade pitch, incorporating trailing edge flaps controlled by electric actuators thus enables the performance of the aircraft to be improved, in particular by reducing the weight of the hydraulic equipment and of the swashplate, and also by reducing the drag induced by the swashplate and its accessories. This also makes it possible to improve the handling of failures and of malfunctions.

The device may also include one or more additional characteristics.

For example, the main actuators may be actuators having a utilization frequency that is sufficient to control the main flaps for imparting both cyclic and multi-cyclic control thereto.

It should be observed that cyclic pitch control, one of the components of primary flight control, takes place over one cycle of the main rotor, i.e. at a frequency equal to the frequency of rotation of the main rotor, whereas collective pitch control is independent of the rotation of the rotor, i.e. independent of the frequency of the rotor. In contrast, multi-cyclic control needs to be performed at a frequency greater than the frequency of the rotor. Variations in the angles of attack of the blades for attenuating noise and vibration phenomena need to be performed mainly at particular frequencies equivalent to $2\omega$, where $\omega$ corresponds to the speed of rotation of the main rotor, and to $(b-1)\omega$, $b\omega$, and $(b+1)\omega$, where b corresponds to the number of blades of the main rotor.

Furthermore, it should be observed that it is known that a mechanical system made up of three actuators operated in parallel at a frequency F is capable of reaching frequencies $(F-1)$, F, and $(F+1)$ by combinations of those three actuators.

In applying that principle to the device of the invention, it is possible for the flaps and consequently for the blades, i.e. for the rotary plate, to reach frequencies equivalent to $(b-1)\omega$, $b\omega$, and $(b+1)\omega$ with actuators located in the fixed frame of reference and having a utilization frequency of $b\omega$.

Consequently, the electric actuators placed in the fixed frame of reference need to control the swashplate at a frequency $\omega$ corresponding to the speed of rotation of the main rotor for primary flight control and at a frequency corresponding to $b\omega$ in order to attenuate noise and vibration.

The limits on operating hydraulic actuators do not allow them to be used at high frequencies, and in particular at the frequencies needed for multi-cyclic control, without damaging the actuator, in particular damaging its gaskets.

In contrast, electric actuators can be controlled at much higher frequencies while remaining reliable and accurate. They are therefore capable of controlling the swashplate at frequencies that are compatible with multi-cyclic control.

In the particular configuration of a main rotor having three blades, three actuators positioned in the stationary frame of reference enable the flaps positioned on the blades to be controlled exactly and independently and at all of the frequencies. Rules of geometry define that three points suffice for defining a plane. The swashplate can be considered as being a plane and it is capable of transmitting the movements of three actuators located in the fixed frame of reference to the flaps of three blades located in the rotating frame of reference. It is therefore possible to control those flaps independently of one another by using actuators that are located in the fixed frame of reference.

Furthermore, in this particular configuration of a main rotor having three blades, the main frequencies that need to be covered for varying the angles of attack of the blades in order to attenuate all of the noise and vibration lie in the range $2\omega$ to $4\omega$, it being understood that $2\omega$, $3\omega$, and $4\omega$ correspond respectively to $(b-1)\omega$, $b\omega$, and $(b+1)\omega$. As mentioned above, with an actuator located in the fixed frame of reference, a frequency of 3ω suffices to reach frequencies lying in the range 2ω to 4ω at the flaps and consequently at the blades.

It is therefore possible with a three-bladed main rotor, each blade having at least one flap, to control each of the flaps independently, and consequently to control each of the blades independently by means of actuators that are located in the stationary frame of reference, these actuators being dimensioned to be capable of operating at a frequency that is sufficient to enable them to reach frequencies of the order of at least 3ω. All of the noise and vibration can thus be attenuated, i.e. the main flaps and consequently the blades can be subjected to multi-cyclic control using the same actuators as those that are also imparting cyclic control to the main flaps and thus to the blades.

In the particular configuration of a main rotor having four blades, and in the same manner, three actuators positioned in the stationary frame of reference do not enable four flaps to be controlled independently at all of the frequencies. However, tests have shown that noise and vibration can be attenuated by about 90% by controlling the blades at frequencies equivalent to 3ω or (b−1)ω, 4ω or bω, and 5ω or (b+1)ω.

Furthermore, as mentioned above, it is possible to control the flaps and consequently the blades at frequencies equivalent to 3ω or (b−1)ω, 4ω or bω, and 5ω or (b+1)ω with actuators that are positioned in the stationary frame of reference and capable of reaching a frequency of 4ω or bω.

Thus, with a main rotor having four blades, each blade having at least one flap, it is possible to control each flap by actuators that are positioned in the stationary frame of reference, and consequently to control each corresponding blade. Actuators that are dimensioned to be capable of operating at a sufficiently high frequency of the order of at least 4ω enable the frequencies of 3ω, 4ω, and 5ω to be obtained at the flaps and can attenuate about 90% of the noise and vibration. Thus, the main flaps and consequently the blades can be subjected to multi-cyclic control using the same actuators as are used for imparting cyclic control thereto.

Naturally, the invention is not limited to a rotor having four blades.

Furthermore, in a preferred embodiment, it may be advantageous to dissociate the primary flight control function and the function of attenuating noise and vibration, i.e. to dissociate cyclic control of the main flaps and multi-cyclic control of the main flaps. Primary flight control must always have priority over attenuating noise and vibration for reasons of safety, and it is easier to achieve such priority if each function is performed by a specific actuator.

For this purpose and still in the particular configurations of a main rotor having three blades or four blades, each main actuator located in the stationary frame of reference may be replaced by two actuators connected in series, a main electric actuator with a utilization frequency that is sufficient for imparting cyclic control to the main flaps, and consequently to the blades, and a second electric actuator with a utilization frequency sufficient for imparting multi-cyclic control to the main flaps, and consequently to the blades.

In the more general configuration of any main rotor, i.e. regardless of the number of blades it has, it is difficult or impossible to control the blade flaps independently while using actuators located in the stationary frame of reference, as can easily be understood from the above explanation.

In order to be able to control each blade flap, it is possible to add a number of secondary actuators to the device equal to the number of blade flaps. Each secondary actuator mounted in the rotary frame of reference between the swashplate and a main flap then needs to have a utilization frequency that is sufficient to enable it to reach frequencies of the order of at least (b+1)ω, where ω corresponds to the speed of rotation of the main rotor and b corresponds to the number of blades of the main rotor, in order to impart multi-cyclic control to the main flaps. Each main flap, and consequently each blade, can then be controlled in multi-cyclic manner with frequencies equivalent to 2ω, (b−1)ω, bω, and (b+1)ω, in order to attenuate all of the noise and vibration.

In an alternative of the invention, at least one secondary flap is incorporated in each blade. Each secondary flap is controlled by a respective electric actuator in order to be subjected to multi-cyclic control, independently of the main flaps.

Still for the purpose of dissociating the primary flight control functions from the function of attenuating noise and vibration, it is advantageous to dissociate the flaps that perform these two functions. Thus, electric actuators in the stationary frame of reference provide cyclic control via the swashplate and a linkage, and a series of main flaps in order to provide primary flight control, and secondary electric actuators provide multi-cyclic control for a series of secondary flaps in order to attenuate noise and vibration.

Once more, primary flight control has priority over attenuating noise and vibration. However, in the event of need, e.g. during very acrobatic flight, primary flight control may be provided by the main flaps assisted by the secondary flaps then subjected to cyclic control, thereby improving the reactivity and the maneuverability of the aircraft.

In addition, in the event of a failure in the control system for the primary flap, the secondary flaps can take over primary flight control in temporary manner for the time required to correct the failure.

As mentioned above, the electric actuators may be electric actuators arranged between the rotary plate and each secondary flap, with a utilization frequency that is sufficient, which maximum utilization frequency should be of the order of (b+1)ω. The device enables multi-cyclic mode control to be performed, but it can complicate the rotary plate and make it heavier by adding a second linkage, in addition to the system for controlling the main flaps.

Another alternative is to place the secondary actuators inside the blades. Electrical power may be fed to these actuators by known systems for rotary elements, or indeed by induction type, contactless systems.

The secondary flaps are limited to attenuating noise and vibration and are involved only in complementary manner in primary flight control, so they may be of limited dimensions and the actuators controlling them may also be of small size. Although they do have an effect on blade balancing, that effect remains small and can even be compensated by the improvements they deliver on the behavior of the blades.

This embodiment presents the advantage of incorporating the actuators in the blades and consequently of generating no additional aerodynamic disturbance.

In a variant, the secondary flaps may be controlled by piezo-ceramic actuators incorporated in each blade.

In another embodiment of the invention, multi-cyclic control of the main or secondary flaps makes use of a control algorithm that operates in a closed loop with continuous identification of the vibratory response of the aircraft.

The algorithm serves in real time to analyze vibration at various points in the aircraft, and thus to analyze the impact of the cyclic and multi-cyclic control of the flaps and to correct the effects thereof rapidly, in order both to optimize the attenuation of noise and vibration and also to correct any disturbances that might be generated on primary flight control. The measurements may be performed at various points of the main rotor, the blades, or the aircraft, via vibration sensors such as accelerometers in order to analyze the vibration, or microphones in order to analyze soundwaves.

In another embodiment, the device for varying blade pitch controlling the main actuators may be provided with at least two computers, with a calculation control system that is duplicated.

Still for reasons of safety and in order to take maximum advantage of electric controls, the device serves to impart redundancy to the electric actuator control system in order to anticipate failures and malfunctions.

Thus, by putting various calculation systems in parallel, such as different algorithms or different processors, and by comparing or combining the results of those different calculation processes, the device can once again optimize the primary flight control function and the function of attenuating noise and vibration.

Such computers possessing at least two different calculation systems, e.g. using different processors, are said to be "asymmetrical". This has the advantage of further increasing the number of calculation channels, and thus of making calculation safer.

The calculation control system may be duplicated, in which case the system is generally referred to as being a "duplex" system, or it may be quadruplicated, in which case reference is made to a "quadruplex" system.

This type of computer that is used mainly for primary flight control may also be used for attenuating noise and vibration, i.e. for multi-cyclic control.

Another alternative of the invention provides for the flight control system controlling the main actuators to be based on electrical or optical technology.

An optical transmission system is insensitive to electromagnetic disturbances, unlike an electrical system, which can be disturbed by such waves. An optical system thus presents certain advantages, both for primary flight control and for multi-cyclic control, in order to guarantee good operation regardless of the environment through which the aircraft is passing.

However an electrical system is easier to install and to maintain. Which technology is chosen therefore depends on requirements and on the specifications to be complied with.

The present invention also provides a rotary wing aircraft using the above-specified device.

Since the device of the invention makes it possible to eliminate the need for hydraulic power for varying the pitch of the blades of the main rotor, it may be advantageous to minimize this need for hydraulic power in the aircraft as far as possible with the aim of being able to eliminate hydraulic power completely. In particular, it may be advantageous to replace the traditional tail rotor with a tail rotor in which the collective pitch is controlled by at least one electric actuator.

In order to optimize utilization of the tail rotor, the rotary drive for the tail rotor may be separated from the drive for the main rotor, and it may be obtained by using an electric motor.

The tail rotor is essentially driven by the same engine as drives the main rotor, at a fixed speed ratio. The speed of rotation of the tail rotor is thus always proportional to the speed of rotation of the main rotor.

The usefulness of the tail rotor can vary depending on the stage of flight. It is essential while performing hovering flight or vertical flight, but it can become useless or even penalizing when performing cruising flight at high speed. The main function of the tail rotor, i.e. to counter the torque created by rotating the main rotor, can be obtained in cruising flight by a fairing for the tail rotor or by a tail fin, in which case the tail rotor is essentially a source of drag and noise. It therefore appears to be advantageous to be able to modulate the speed of rotation of the tail rotor as well as or as a replacement for varying the pitch of its blade, in order to optimize the performance of the aircraft. In addition, the tail rotor consumes some of the power of the main engine driving the main rotor. Separating the tail rotor from the main engine thus makes it possible to increase the performance of the aircraft by using the main engine essentially for driving the main rotor, i.e. for causing the aircraft to move.

Finally, the transmission system between the main engine and the tail rotor represents a significant mass in the aircraft whereby suppressing it would also save an appreciable amount of space.

Consequently, the use of an electric motor driving rotation of the tail rotor may be an advantageous solution for achieving an improvement in the performance of the aircraft.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a view of a rotary wing aircraft fitted with the device of the invention;

FIGS. 2 to 5 show various embodiments of the device of the invention for varying the pitch of the blades;

DETAILED DESCRIPTION OF THE INVENTION

Figure 6:
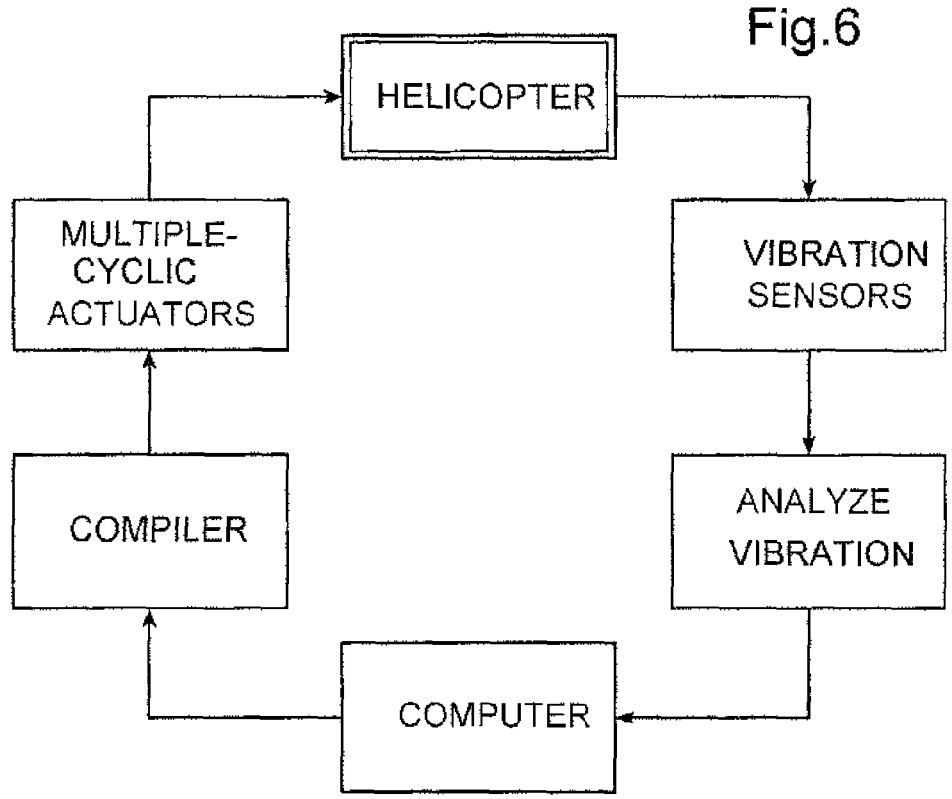
FIG. 6 shows the closed loop operating principle of the algorithm controlling the noise and vibration attenuation system.

Elements present in more than one of the figures are given the same references in each of them.

FIG. 1 shows a rotary wing aircraft 50 comprising a fuselage 51, a device 10 for varying the pitch of the blades 12 of a main rotor 11, and a tail rotor 52 having at least two blades 57.

The device 10 for varying blade pitch comprises the main rotor 11 having a plurality of blades 12, main flaps 13 being positioned at the trailing edge of each blade 12. In addition, the device 10 has main actuators 21 controlling pivoting of the main flaps 13 and their angle of inclination relative to the flow of air, thereby modifying the lift of the blade-and-flap assembly, and consequently varying the pitch of each corresponding blade 12 under the effect of aerodynamic forces.

The device also includes a flight control system 54 for transmitting orders from the pilot to the main actuators 21.

In a first embodiment shown in FIG. 2, the device 10 for varying blade pitch comprises a swashplate 20 having a non-rotating plate 23 and a rotating plate 24 that rotates with the main rotor 11. The rotating plate 24 acts via a mechanical connection 25 to drive the angle of inclination of each main flap 13 and consequently to vary the pitch of each blade 12. The main actuators 21 are electric actuators 22 located in a stationary frame of reference. These electric actuators 22 serve to move and vary the angle of inclination of the non-rotary plate 23, thereby controlling the main flaps 13 and consequently each corresponding blade 12, at least cyclically.

The movement of the non-rotary blade 23 gives rise to movement of the rotary plate 24 that acts via the mechanical connection 25 to cause each main flap 13 to vary its angle of inclination in identical manner, thereby varying the pitch of each blade 12. This performs collective variation of the pitch of the blades 12.

The angle of inclination of the non-rotary plate 23 determines the angle of inclination of the rotary plate 24 that acts via the mechanical connection 25 to vary the angle of inclination of each main flap 13 by a specific value that is a function of its azimuth position, and consequently varies the pitch of each blade 12. This imparts cyclic variation to the pitch of the blades 12.

In a second embodiment of the invention specific to rotary wing aircraft 50 in which the main rotor 11 has three or four blades 12, the electric actuators 22 located in the stationary frame of reference have an operating frequency that enables the main flaps 13, and consequently the pitch of the blades 12, to be operated cyclically and multi-cyclically.

It should be observed that it is known that the noise and vibration generated in particular by the main rotor 11 can be attenuated by modifying the pitch of the blades 12 several times in a single revolution of the main rotor 11, with the pitch of the blades then being said to be controlled multi-cyclically.

Tests have also confirmed that these variations in blade pitch need to be performed at particular frequencies equivalent to $2\omega$, where $\omega$ corresponds to the speed of rotation of the main rotor 11, and also at $(b-1)\omega$, $b\omega$, and $(b+1)\omega$, where b corresponds to the number of blades 12 in the main rotor 11.

Thus, for the general case of a main rotor 11 having a plurality of blades 12, it is known that the pitch of the blades 12 needs to be modified at a frequency that is at least equivalent to $\omega$, where $\omega$ corresponds to the speed of rotation of said rotor 11, in order to perform cyclic pitch variation, and at a utilization frequency equivalent to $2\omega$, $(b-1)\omega$, $b\omega$, and $(b+1)\omega$, where b corresponds to the number of blades 12 of the main rotor 11, in order to perform multi-cyclic variation.

Furthermore, it is known that it is possible to achieve frequencies equivalent to $(b-1)\omega$, $b\omega$, and $(b+1)\omega$ in the rotating frame of reference with actuators that are positioned in the stationary frame of reference, using a frequency equal to $b\omega$.

For a main rotor 11 having three blades 12, it is possible for the main flap 13 to reach frequencies equivalent to $2\omega$, $3\omega$, and $4\omega$ using main actuators 22 that have a utilization frequency of not less than $3\omega$ and located in the stationary frame of reference. Consequently, multi-cyclic variation of the pitch of the blades 12 can be achieved for the purpose of attenuating all of the noise and vibration.

Similarly, for a main rotor 11 having four blades 12, it is possible for the main flap 13 to reach frequencies equivalent to $3\omega$, $4\omega$, and $5\omega$ while using main actuators 22 having a utilization frequency of at least $4\omega$ and located in the stationary frame of reference. In contrast, in this particular configuration, it is possible to attenuate only about 90% of the noise and vibration.

The embodiment shown in FIG. 3 is once more specific to rotary wing aircraft 50 in which the main rotor 11 has three or four blades 12.

Each main actuator 21 in this configuration comprises a series association of two electric actuators 22 and 26, one electric actuator 22 having a utilization frequency equivalent at least to $\omega$ in order to perform cyclic variation of the pitch of the blades 12, and one electric actuator 26 having a utilization frequency equivalent to $b\omega$, where b corresponds to the number of blades 12 of the main rotor 11, in order to perform multi-cyclic variation of the pitch of the blades 12.

By separating the cyclic and multi-cyclic controls, this embodiment provides extra safety. Those two operations can then be managed independently. Furthermore, since cyclic control corresponds to the primary flight control, and thus has a safety function, it needs to be given priority over multi-cyclic control that serves to attenuate noise and vibration, i.e. that performs a comfort function. By using two actuators 22 and 26 that are controlled independently, it is easier to achieve such prioritization.

The embodiment shown in FIG. 4 relates to the general case of aircraft 5 having a main rotor 11 with a plurality of blades 12. In this configuration it is difficult or impossible to control the main flaps 13 independently by means of actuators that are positioned in the stationary frame of reference.

In order to be able to control each main flap 13 in independent manner in order to attenuate noise and vibration, a number of secondary actuators 27 equal to the number of blades 12 may be added to the device 10. Each secondary actuator 27 mounted in the rotary frame of reference between the rotary plate 24 and a main flap 13 must be capable of covering utilization frequencies equivalent to $2\omega$, $(b-1)\omega$, $b\omega$, and $(b+1)\omega$ in order to perform multi-cyclic control of the main flaps and consequently of the pitch of the blades 12.

Consequently, the mechanical connection 25 includes a number of secondary electric actuators 27 that is equal to the number of blades 12 of the main rotor 11, each secondary actuator 27 having a utilization frequency that is equivalent at least to $(b+1)\omega$, where b corresponds to the number of blades 12 of the main rotor 11, and $\omega$ corresponds to the speed of rotation of said main rotor 11. The device 10 for varying blade pitch is thus capable of controlling the main flap 13 cyclically and consequently of controlling the blades 12 cyclically by using the electric actuators 22 that are positioned in the stationary frame of reference, and also to provide multi-cyclic control of the main flap 13 and consequently of the pitch of the blades 12 by using the secondary electric actuators 27 that are positioned in the rotary frame of reference.

In another embodiment shown in FIG. 5, a secondary flap 14 is incorporated in each blade 12. Each secondary flap 14 is controlled independently and multi-cyclically by a secondary electric actuator 15. Varying the angle of inclination of a secondary flap 14 leads to the pitch of the blades 12 being varied on the same principle as for the main flap 13, and this variation is used for attenuating noise and vibration.

Adding the secondary flap 14 makes it possible to separate the primary flight control function from the noise and vibration attenuation function. Thus, the electric actuators 22 in the stationary frame of reference act via the swashplate 20 and the mechanical connection 25 to provide cyclic control of a series of main flaps 13 and consequently of the pitch of the blades 12, thereby providing the primary flight control, and secondary electric actuators 15 provide multi-cyclic control of a series of secondary flaps 14 and consequently of the pitch of the blades 12 in order to attenuate noise and vibration.

Once more, the primary flight control has priority over attenuating noise and vibration. However, where necessary, e.g. during very acrobatic flight, the secondary flaps 14 can assist the main flaps 13. Under such circumstances, the secondary flaps 14 are controlled cyclically and serve to improve the reactivity and the maneuverability of the rotary wing aircraft 50.

In addition, in the event of a failure in the system for controlling the main flaps 13, the secondary flaps 14 can take on primary flight control on a transient basis for the time it takes the computer to correct the failure.

In a variant of the device 10, the secondary actuators 15 are piezo-ceramic actuators incorporated in each blade 12. In order to attenuate all of the noise and vibration, it is known that their utilization frequency must be equivalent to at least $(b+1)\omega$.

In another embodiment of the invention, the rotary wing aircraft 50 has a computer 55 with at least one processor and memory. The aircraft 50 is also fitted with vibration sensors 56, such as accelerometers or microphones based at various points in the aircraft 50, such as on the main rotor 11, and the fuselage 51, for example, in order to analyze the vibratory or sound waves present in the environment of the aircraft 50.

A multi-cyclic control algorithm is stored in the memory and operates in a closed loop as shown in FIG. 6 with the vibratory response of the aircraft as obtained via the vibration sensors 56 being identified continuously.

This algorithm serves in particular in real time to analyze vibration at various points of the aircraft 50, and thus to analyze the impact of the cyclic and multi-cyclic control of the flaps 13, 14, thereby enabling their effects to be corrected rapidly. It is then possible to control the secondary actuators 15, 26, or 27, depending on the embodiment in such a manner as both to optimize attenuation of noise and vibration and also to correct disturbances that might be generated on the primary flight control.

The computer 55 may also have two different processors and be capable of using algorithms that are identical or different. This serves to impart redundancy to the calculation control system, in particular for the purpose of anticipating failures and malfunctions.

By putting a plurality of calculation systems in parallel, such as different algorithms or different processors, and by comparing or combining the results from those various calculation processes, the computer 55 can once more optimize the primary flight control function and the noise and vibration attenuation function.

The calculation control system may be duplicated, giving a system commonly referred to as a "duplex" system, or quadruplicated, in which case the system may be said to be "quadruplex".

This type of computer is used mainly for the primary flight control but can also be used for attenuating noise and vibration, i.e. for performing multi-cyclic control.

Figure 7:
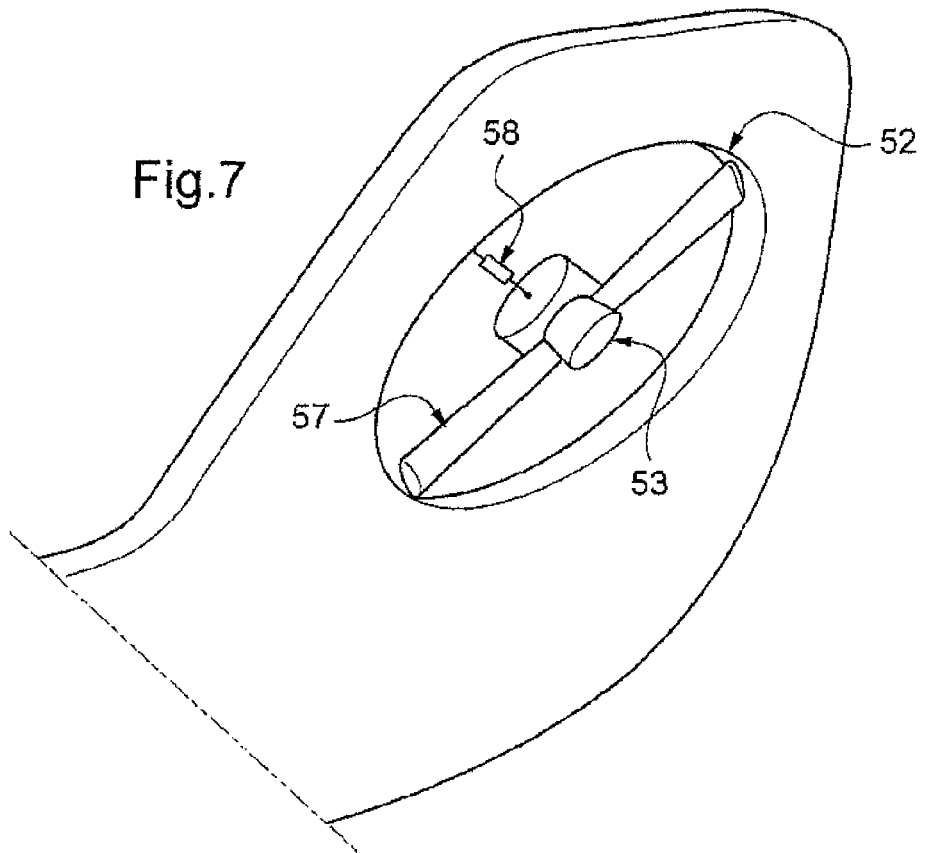
FIG. 7 is a view of a tail rotor of a rotary wing aircraft.

FIG. 7 shows a tail rotor 52 having an actuator 58 for controlling variation in the collective pitch of the blades 57.

Since the device of the invention makes it possible to eliminate the need for hydraulic power for varying the pitch of the blades 12 of the main rotor 11, it may be advantageous to minimize this need for hydraulic power in the aircraft so far as possible with the aim of being able to eliminate hydraulic power completely. In particular, it is advantageous to replace a traditional tail rotor with a tail rotor 52 in which the collective pitch is controlled by at least one electric actuator 58.

Furthermore, in order to optimize utilization of the tail rotor 52, the rotary drive for the tail rotor 52 may be separate from the drive for the main rotor 11, and it may be obtained by using an electric motor 53.

The tail rotor 52 is essentially driven by the same engine as drives the main rotor 11, at a fixed speed ratio. The speed of rotation of the tail rotor 52 is thus always proportional to the speed of rotation of the main rotor 11.

The usefulness of the tail rotor 52 can vary depending on the stage of flight. It is essential while performing hovering flight or vertical flight, but it can become useless or even penalizing when performing cruising flight at high speed. The main function of the tail rotor 52, i.e. to counter the torque created by rotating the main rotor 11, can be obtained in cruising flight by a fairing for the tail rotor or by a tail fin, in which case the tail rotor 52 is essentially a source of drag and noise. It therefore appears to be advantageous to be able to modulate the speed of rotation of the tail rotor 52 as well as or as a replacement for varying the pitch of its blade 57, in order to optimize the performance of the aircraft 50. In addition, the tail rotor 52 consumes some of the power of the main engine driving the main rotor 11. Separating the tail rotor 52 from the main engine thus makes it possible to increase the performance of the aircraft 50 by using the main engine essentially for driving the main rotor 11, i.e. for causing the aircraft 50 to move.

Consequently, the use of an electric motor 53 driving rotation of the tail rotor 52 may be an advantageous solution for achieving an improvement in the performance of the aircraft 50.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A device for varying blade pitch for a rotary wing aircraft including:
a main rotor having a plurality of blades;
at least one main flap per blade, each main flap being turnable about an axis to modify the pitch of the blade;
main actuators controlling the angles of inclination of the main flaps; and
a flight control system controlling the main actuators;
wherein the device for varying blade pitch comprises at least one secondary flap incorporated in each blade and a swashplate having a non-rotary plate and a rotary plate rotating with the main rotor, the rotary plate acting via a mechanical connection to change the angle of inclination of each main flap and consequently to change the pitch of the corresponding blade, the main actuators being electric actuators for moving and varying the angle of inclination of the non-rotary plate in order to control the main flaps at least cyclically, each secondary flap being subjected to multi-cyclic control by a piezoceramic secondary flap electric actuator incorporated in each blade and having a utilization frequency equivalent to at least $(b+1)\omega$, where b corresponds to the number of blades of the main rotor and $\omega$ corresponds to the speed of rotation of the main rotor.

2. A device according to claim 1, wherein the main rotor has a number b of blades equal to three or four, and the main actuators have a utilization frequency equivalent to not less than the product $b\omega$, where $\omega$ corresponds to the speed of rotation of the main rotor in order to control the main flaps both cyclically and multi-cyclically.

3. A device according to claim 2, wherein the device includes at least one computer cooperating with the flight control system, the computer having memory and at least one processor, at least one vibration sensor, a multi-cyclic control algorithm stored in the memory, and operating in a closed loop with continuous identification of the vibratory response of the aircraft by means of the vibration sensors in order to optimize the multi-cyclic control of the main flaps.

4. A device according to claim 1, wherein the main rotor has a number b of blades equal to three or four, and each main actuator comprises a main electric actuator having a utilization frequency equivalent to at least $\omega$, where $\omega$ corresponds to the speed of rotation of the main rotor in order to control the main flaps cyclically, and a secondary electric actuator having a utilization frequency equivalent to at least $b\omega$ in order to control the main flaps multi-cyclically, the main actuator and the secondary actuator being connected in series.

5. A device according to claim 1, wherein the mechanical connection has a number of secondary electric actuators equal to the number of the blades of the main rotor, each secondary actuator being connected between the rotary plate and a the main flap, and having a utilization frequency equivalent to at least (b+1)ω, where b corresponds to the number of the blades of the main rotor and ω corresponds to the speed of rotation of the main rotor, in order to control the main flaps multi-cyclically.

6. A device according to claim 1, wherein the secondary flap actuators are suitable for being controlled cyclically in order to provide primary flight control.

7. A device according to claim 1, wherein the device has at least two computers cooperating with the flight control system, the at least two computers having two different processors and suitable for using algorithms that are identical or different, the at least two computers being used for imparting cyclic control to the main flaps.

8. A device according to claim 1, wherein the device includes at least one computer cooperating with the flight control system, the at least one computer having two different processors and suitable for using algorithms that are identical or different, the at least one computer being used for multi-cyclic control of the secondary flap actuators.

9. A device according to claim 1, wherein the flight control system is either an electric flight control system or an optical flight control system.

10. A rotary wing aircraft comprising:
a fuselage;
a tail rotor having at least two blades; and
a device for varying blade pitch, the device including:
  a main rotor having a plurality of blades;
  at least one main flap per blade, each main flap being movable in turning about an axis to modify the pitch of the blade;
  main actuators controlling the angles of inclination of the main flaps; and
  a flight control system controlling the main actuators;
the device for varying blade pitch comprising at least one secondary flap incorporated in each blade and a swashplate having a non-rotary plate and a rotary plate rotating with the main rotor, the rotary plate acting via a mechanical connection to change the angle of inclination of each main flap and consequently to change the pitch of the corresponding blade, the main actuators being electric actuators for moving and varying the angle of inclination of the non-rotary plate in order to control the main flaps at least cyclically, each secondary flap being subjected to multi-cyclic control by a piezo-ceramic secondary flap electric actuator incorporated in each blade and having a utilization frequency equivalent to at least (b+1)ω, where b corresponds to the number of blades of the main rotor and ω corresponds to the speed of rotation of the main rotor.

11. A rotary wing aircraft according to claim 10, wherein variation of the pitch of the blades of the tail rotor is controlled via at least one tail rotor electric actuator.

12. A rotary wing aircraft according to claim 11, wherein the at least one tail rotor electric actuator is an electric jack.

13. A rotary wing aircraft according to claim 10, wherein the tail rotor is driven in rotation by an electric motor.

14. A rotor control assembly comprising:
a main rotor having a rotor blade;
a main flap coupled to the rotor blade and configured to pivot about an axis to modify blade pitch of the rotor blade;
a swashplate having a non-rotary plate and a rotary plate, the rotary plate being configured to rotate with the main rotor;
a mechanical connection arranged between the rotary plate and the main flap, the mechanical connection being configured to change an angle of inclination of the main flap;
an electric main flap actuator configured to vary an angle of inclination of the non-rotary plate to control the main flap;
a flight control system configured to control the main flap actuator;
a secondary flap coupled to the blade; and
a piezo-ceramic electric secondary flap actuator arranged in the rotor blade and configured to actuate the secondary flap multi-cyclically at a frequency of least (b+1)ω, where b corresponds to a total number of blades of the main rotor and ω corresponds to the speed of rotation of the main rotor.

15. The rotor control assembly of claim 14, wherein the total number of blades of the main rotor is greater than one.

16. The rotor control assembly of claim 14, wherein the total number of blades of the main rotor is three or four, and wherein the electric main flap actuator is configured to actuate the main flap at a frequency of at least bω.

17. The rotor control assembly of claim 14, further comprising a secondary electric main flap actuator in series with the electric main flap actuator, wherein the total number of blades of the main rotor is three or four, and wherein the electric main flap actuator is configured to actuate the main flap at a frequency of at least ω, and the secondary electric main flap actuator is configured to actuate the main flap at a frequency of least bω.

18. The rotor control assembly of claim 14, wherein the mechanical connection includes a secondary electric main flap actuator configured to actuate the main flap at a frequency of least (b+1)ω.

* * * * *